US012679463B2

(12) United States Patent
Kuter-Arnebeck et al.

(10) Patent No.: US 12,679,463 B2
(45) Date of Patent: Jul. 14, 2026

(54) REINFORCING FRAME FIXTURE FOR ELECTRIC VEHICLES

(71) Applicant: Snap-on Incorporated, Kenosha, WI (US)

(72) Inventors: Ottoleo Kuter-Arnebeck, Kenosha, WI (US); Nicholas H. Weir, Kenosha, WI (US); Nicholas A. Gabbey, Kenosha, WI (US); Christian P. Greene, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 589 days.

(21) Appl. No.: 17/872,400

(22) Filed: Jul. 25, 2022

(65) Prior Publication Data

US 2024/0025479 A1      Jan. 25, 2024

(51) Int. Cl.
| | |
|---|---|
| *B62D 25/20* | (2006.01) |
| *B60K 1/04* | (2019.01) |
| *B62D 21/15* | (2006.01) |

(52) U.S. Cl.
CPC .............. *B62D 21/152* (2013.01); *B60K 1/04* (2013.01); *B62D 25/20* (2013.01); *B60K 2001/0455* (2013.01)

(58) Field of Classification Search
CPC ...... B62D 21/152; B62D 25/20; B62D 21/00; B60K 1/04; B60K 2001/0438; B60K 2001/0405; B60K 2001/0455; B25H 1/0007; B60L 50/66; B60L 53/80; B60S 5/06; B60G 2206/14
See application file for complete search history.

(56) References Cited

U.S. PATENT DOCUMENTS

| | | | | |
|---|---|---|---|---|
| 2,676,031 A | * | 4/1954 | Kolbe ...................... | B60G 3/20 |
| | | | | 280/124.103 |
| 6,443,518 B1 | * | 9/2002 | Rohl .................... | B62D 25/082 |
| | | | | 296/187.12 |

(Continued)

FOREIGN PATENT DOCUMENTS

| | | |
|---|---|---|
| CN | 211441936 U | 9/2020 |
| CN | 114162217 A | 3/2022 |

(Continued)

OTHER PUBLICATIONS

United Kingdom Combined Search and Examination Report for corresponding UK Application No. GB2311036.4, dated Jan. 18, 2024, 7 pages.

(Continued)

*Primary Examiner* — Daniel J Colilla
(74) *Attorney, Agent, or Firm* — Taft, Stettinius & Hollister LLP

(57) ABSTRACT

A reinforcing frame structure that bolts or otherwise couples in place of a battery assembly of a vehicle, such as an electrically powered vehicle, and provides sufficient longitudinal, transverse, and torsional rigidity to the vehicle when the battery assembly is removed from the vehicle. The reinforcing frame structure can be releasably attached to the vehicle after the battery assembly is removed. This allows the vehicle to be taken off a lift and moved while minimizing potential damage to the vehicle while the battery assembly is removed from the vehicle.

14 Claims, 4 Drawing Sheets

(56) References Cited

U.S. PATENT DOCUMENTS

| 8,074,757 | B2 * | 12/2011 | Wagner | B62D 21/152 |
| | | | | 903/952 |
| 8,585,132 | B2 * | 11/2013 | Klimek | B62D 25/082 |
| | | | | 296/193.07 |
| 9,346,346 | B2 | 5/2016 | Murray | |
| 9,601,733 | B2 | 3/2017 | Sham | |
| 10,899,213 | B2 * | 1/2021 | Baccouche | B60K 1/04 |
| 11,088,412 | B2 | 8/2021 | Matecki et al. | |
| 2008/0172955 | A1 * | 7/2008 | McClintock | F24S 25/70 |
| | | | | 52/173.3 |
| 2017/0317325 | A1 | 11/2017 | Sham | |
| 2019/0157643 | A1 * | 5/2019 | Glaser | H01M 50/242 |
| 2021/0061080 | A1 * | 3/2021 | Otoguro | B62D 21/15 |
| 2022/0134857 | A1 * | 5/2022 | Baccouche | B62D 25/2036 |
| | | | | 180/68.5 |
| 2023/0264563 | A1 * | 8/2023 | Kamemoto | B62D 21/07 |
| | | | | 180/68.5 |

FOREIGN PATENT DOCUMENTS

| CN | 216783628 | U | 6/2022 | |
| CN | 116513314 | A | 8/2023 | |
| DE | 102018216891 | A1 | 4/2020 | |
| JP | H0752835 | A | 2/1995 | |
| JP | 2007203896 | A | 8/2007 | |
| TW | I523777 | B | 3/2016 | |
| WO | 2019245380 | A1 | 12/2019 | |
| WO | WO-2019235380 | A1 * | 12/2019 | B60L 50/64 |
| WO | 2022143947 | A1 | 7/2022 | |

OTHER PUBLICATIONS

Australian Patent Office, Examination Report No. 2 issued in corresponding Application No. 2023204714, dated May 19, 2025, 3 pp.

Australian Patent Office, Examination Report No. 1 issued in corresponding Application No. 2023204714, dated Jul. 25, 2024, 8 pp.

Taiwan Patent Office, First Office Action issued in corresponding Application No. 112127692, dated Mar. 22, 2024, 9 pp.

UK Intellectual Property Office, Combined Search and Examination Report issued in corresponding Application No. GB2410629.6, dated Oct. 24, 2024, 4 pp.

Canadian Patent Office, Examination Report issued in corresponding Application No. 3,207,508, dated Dec. 19, 2024, 5 pp.

Taiwan Patent Office, Second Office Action issued in corresponding Application No. 112127692, dated Jan. 10, 2025, 6 pp.

"Swapping the Roof—Golf Episode 31 Volkswagen Mk1 Golf GTI Resto," YouTube Video, URL: https://www.youtube.com/watch?v=6SHFDYu9-vY, Accessed Apr. 10, 2025.

Taiwant Patent Office, Office Action issued in corresponding Application No. 112127692, dated Jul. 7, 2025, 7 pp.

Canadian Patent Office, Examination Report issued in corresponding Application No. 3,207,508, dated Dec. 30, 2025, 4 pp.

* cited by examiner

REINFORCING FRAME FIXTURE FOR ELECTRIC VEHICLES

TECHNICAL FIELD

The present invention relates generally to a frame structure that temporarily replaces a battery assembly in an electric vehicle to provide temporary structural stability.

BACKGROUND

Electric vehicles are becoming more widespread and common. Electric vehicles generally include a Lithium-ion battery assembly that holds high voltage batteries/battery cells, which provide power to the vehicle components, including the electric motors. To minimize weight and simplify the manufacturing process, many electric vehicles incorporate the battery assembly into the frame of the vehicle to provide structural support for the vehicle. As shown in FIG. 8, a typical battery pack 500 is often situated between front and rear wheels of an electric vehicle 600 and is bolted to a frame 602 of the vehicle 600 along the side rails 502 of the battery assembly 500. Typically, the battery assembly 500 has many fastening points 504 (such as fastener apertures) that receive fasteners to bolt the battery assembly 500 to the frame 602.

When an issue arises with one or more components of the battery assembly, the entire battery assembly, which functions as part of the structural support of the vehicle, must be removed and/or disassembled to diagnose and correct the issue. To remove the battery assembly, the vehicle is typically lifted with a lift to provide access to the battery assembly. When the battery assembly is removed, the structural integrity of the vehicle may be compromised and the vehicle cannot be taken off of the lift until the battery assembly is reinstalled. Therefore, with the battery assembly removed, the vehicle must be kept immobile and on the lift to prevent damage to the vehicle. The shop performing the repair is now stuck with a vehicle on the lift until the battery assembly is reinstalled, and this lift cannot be used for other vehicles. This situation can prevent other vehicles from being repaired.

SUMMARY

The present invention relates broadly to a reinforcing frame structure that bolts or otherwise temporarily couples in place of a battery assembly of an electric vehicle while the battery assembly is removed, and provides sufficient longitudinal, transverse, and torsional structural rigidity to the vehicle when the battery assembly is removed from the vehicle. The reinforcing frame structure can be attached to the vehicle after the battery assembly is removed. This allows the vehicle to be taken off a lift and moved when the battery assembly is removed without causing damage to the vehicle. The reinforcing frame structure provides sufficient temporary structural stability to allow safe moving of the vehicle, and opening and closing of the vehicle doors, when the battery assembly is removed.

In an embodiment, the present invention relates broadly to a reinforcing frame structure adapted to temporarily couple to battery assembly mounting apertures of a frame of an electric vehicle when a battery assembly is removed from the electric vehicle. The reinforcing frame structure includes first and second longitudinal braces adapted to respectively couple to first and second longitudinal sides of the frame, first and second transverse braces adapted to respectively couple to first and second transverse sides of the frame, and a cross brace adapted to couple to each of the first and second longitudinal braces and the first and second transverse braces.

In another embodiment, the present invention relates broadly to a reinforcing frame structure adapted to temporarily couple to battery assembly mounting apertures of a frame of an electric vehicle when a battery assembly is removed from the electric vehicle. The reinforcing frame structure includes a hub, and first, second, third, and fourth arms, wherein each of the first, second, third, and fourth arms extends outwardly from the hub, and is adapted to couple to a respective battery assembly mounting aperture.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figures 1, 2:
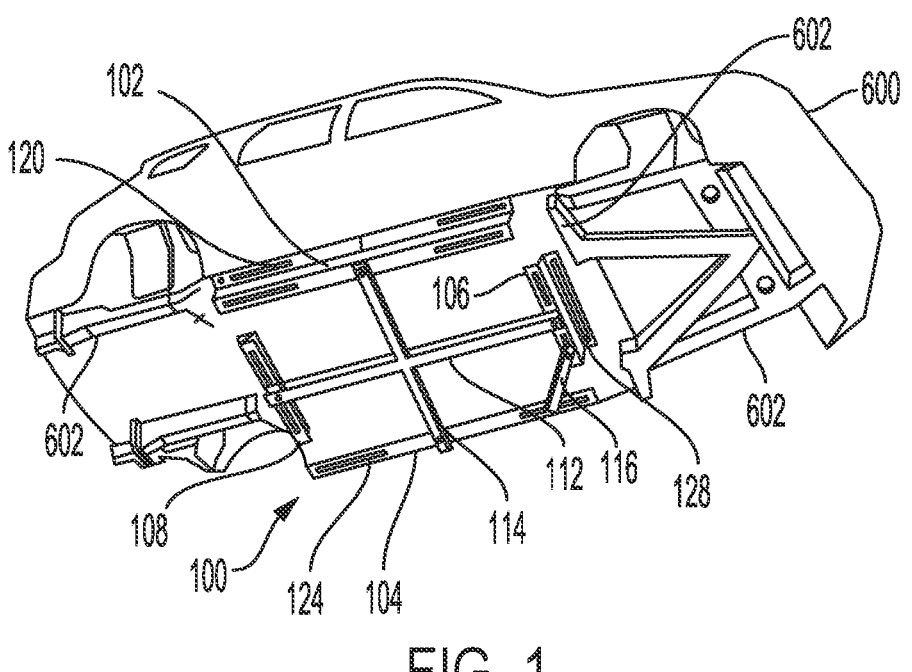
FIG. 1 is a perspective view of a frame structure coupled to a vehicle, according to an embodiment of the invention.
FIG. 2 is a perspective view of the frame structure, according to an embodiment of the invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to a reinforcing frame structure that bolts or otherwise temporarily couples in place of a battery assembly of an electric vehicle, and provides sufficient longitudinal, transverse, and torsional rigidity to the vehicle when the battery assembly is removed from the vehicle. The reinforcing frame structure may be a dedicated configuration to fit a particular make and model of a vehicle, or adjustable to fit more than one vehicle and be more universal. The reinforcing frame structure can be attached to the vehicle after the battery assembly is removed to provide structural rigidity to the vehicle. This allows the vehicle to be taken off a lift and moved while the battery assembly is removed, while minimizing damage to the vehicle caused by the battery assembly being removed and thus not providing the typical structural support to the vehicle. The reinforcing frame structure provide sufficient structural support to allow moving of the vehicle and opening and closing of the vehicle doors, when the battery assembly is removed.

The reinforcing frame structure may include modular support braces that connect with cross braces, and include fastener apertures that can be aligned with and allow for coupling of the frame structure to a vehicle via fasteners. The fastener apertures may also be elongated slots, to allow for adjustability of the frame structure, and alignment of the fastener apertures with corresponding fastener apertures in a frame of the vehicle.

Figure 3:
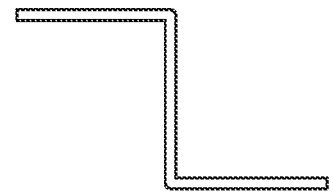
FIG. 3 is a side end view of a component of the frame structure, according to an embodiment of the invention.

Referring to FIGS. 1 and 3, an exemplary reinforcing frame structure 100 according to an embodiment of the present invention is illustrated. The reinforcing frame structure may include first and second longitudinal braces 102, 104, first and second transverse braces 106, 108, a cross brace 110, which includes a longitudinal portion 112 and a transverse portion 114, and one or more corner or angle braces 116. The cross brace 110 may be unitized or modularly adapted. In an embodiment, the cross brace 110 has at least one of each of the longitudinal portion 112 and transverse portion 114, but may have multiples of each. Similarly, in an embodiment, the first and second longitudinal braces 102, 104, and first and second transverse braces 106, 108 may be releasably coupled together with screws or bolts or may be fixed together via a weld or a rivet or other means.

Each of the first and second longitudinal braces 102, 104 may include a vehicle mounting portion or flange 118 with one or more fastener receiving apertures 120, and an angle mounting portion or flange 122 with one or more fastener receiving apertures 124. The one or more fastener receiving apertures 120 may be a single elongated slot that extends longitudinally along the vehicle mounting portion or flange 118, or may be multiple separate slots or apertures spaced longitudinally along the vehicle mounting portion or flange 118. Similarly, the fastener receiving apertures 124 may be a single elongated slot that extends longitudinally along the angle mounting portion or flange 122, or may be multiple separate slots or apertures spaced longitudinally along the vehicle mounting portion or flange 122. As illustrated, the fastener receiving apertures 124 include two fastener receiving apertures 124 proximal to opposing ends of each of the first and second longitudinal braces 102, 104.

Each of the first and second transverse braces 106, 108 may also include a vehicle mounting portion or flange 126 with fastener receiving apertures 128, and an angle mounting portion or flange 130 with fastener receiving apertures 132. The fastener receiving apertures 128 may be a single elongated slot that extends longitudinally along the vehicle mounting portion or flange 126, or may be multiple separate slots or apertures spaced longitudinally along the vehicle mounting portion or flange 126. Similarly, the fastener receiving apertures 132 may be a single elongated slot that extends longitudinally along the angle mounting portion or flange 130, or may be multiple separate slots or apertures spaced longitudinally along the vehicle mounting portion or flange 130. As illustrated, the fastener receiving apertures 132 include two fastener receiving apertures 132 proximal to opposing ends of each of the first and second transverse braces 106, 108.

When assembled, the cross brace 110 is coupled to each of the first and second longitudinal braces 102, 104, and first and second transverse braces 106, 108. For example, the first longitudinal brace 102 is coupled to a first end of the transverse portion 114, and the second longitudinal brace 104 is coupled to an opposing second end of the transverse portion 114. The first transverse brace 106 is coupled to a first end of the longitudinal portion 112, and the second transverse brace 108 is coupled to an opposing second end of the longitudinal portion 112. The cross brace 110 may be pivotally or rotatably, and/or slidably coupled to each of the first and second longitudinal braces 102, 104, and first and second transverse braces 106, 108, to allow for adjustment of each of the first and second longitudinal braces 102, 104, and first and second transverse braces 106, 108 with respect to the cross brace 110.

The angle brace 116 may be coupled to one of the first and second longitudinal braces 102, 104, and also coupled to one of the first and second transverse braces 106, 108. For example, the angle brace 116 may have opposing first and second ends respectively coupled to the first transverse brace 106 (via a first fastener receiving aperture 132) and the second longitudinal brace 104 (via a first fastener receiving aperture 124). Additional angle braces 116 may also be included at each corner. For example, another angle brace 116 may have opposing first and second ends respectively coupled to the first transverse brace 106 (via a second fastener receiving aperture 132) and the first longitudinal brace 102 (via a first fastener receiving aperture 124). Another angle brace 116 may have opposing first and second ends respectively coupled to the second transverse brace 108 (via a first fastener receiving aperture 132) and the first longitudinal brace 102 (via a second fastener receiving aperture 124). Yet another angle brace 116 may have opposing first and second ends respectively coupled to the second transverse brace 108 (via a second fastener receiving aperture 132) and the second longitudinal brace 104 (via a second fastener receiving aperture 124). The slot shape of the fastener receiving apertures allow for adjustment of location of the angle brace(s) 116.

During use, the reinforcing frame structure 100 may be releasably coupled to a frame of a vehicle in place of a battery assembly, to provide sufficient longitudinal, transverse, and torsional rigidity to the vehicle while the battery assembly is removed from the vehicle. For example, the reinforcing frame structure 100 may be releasably coupled to a frame 602 of a vehicle 600. In this example, the first longitudinal brace 102 may be releasably coupled to the frame 602 (along a first longitudinal side of the vehicle between the front and rear tires) via fasteners extending through the fastener receiving apertures 120 of the vehicle mounting portion or flange 118 of the first longitudinal brace 102, and into the existing battery assembly mounting apertures in the frame 602. The second longitudinal brace 104 may also be releasably coupled to the frame 602 (along a second longitudinal side of the vehicle between the front and rear tires) via fasteners extending through the fastener receiving apertures 120 of the vehicle mounting portion or flange 118 of the second longitudinal brace 104, and into the existing battery assembly mounting apertures in the frame 602.

Similarly, the first transverse brace 106 may be releasably coupled to the frame 602 (along a first transverse side or front side of the vehicle proximate to the front tires) via fasteners extending through the fastener receiving apertures 128 of the vehicle mounting portion or flange 126 of the first transverse brace 106, and into the existing battery assembly mounting apertures in the frame 602. The second transverse brace 108 may be releasably coupled to the frame 602 (along a second transverse side or rear side of the vehicle proximate to the rear tires) via fasteners extending through the fastener receiving apertures 128 of the vehicle mounting portion or flange 126 of the second transverse brace 108, and into the existing battery assembly mounting apertures in the frame 602.

In other embodiments, the reinforcing frame structure 100 may be used omitting the cross brace 110. In yet another embodiment, the cross brace 110 may be releasably coupled to the frame of the vehicle, omitting one or more of the first longitudinal brace 102, second longitudinal brace 104, first transverse brace 106, and second transverse brace 108.

Figure 4:
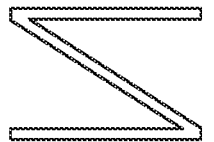
FIG. 4 is a side end view of a component of the frame structure, according to another embodiment of the invention.
Figure 5:
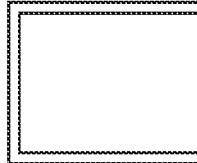
FIG. 5 is a side end view of a component of the frame structure, according to another embodiment of the invention.

Each of the braces may have a square, round, "L", "U," "C", "X", "T", or other type of shaped cross-sectional shapes to provide support to the structure and vehicle when used. The respective cross-sectional shape of the braces may also be the same or different. In an example, one or more of the first longitudinal brace 102, second longitudinal brace 104, first transverse brace 106, and second transverse brace 108 may have a shaped cross-sectional shape as shown in FIG. 3. In another example, as shown in FIG. 4, one or more of the first longitudinal brace 102, second longitudinal brace 104, first transverse brace 106, and second transverse brace 108 may have a "Z" shaped cross-sectional shape. In yet another example, as shown in FIG. 5, one or more of the first longitudinal brace 102, second longitudinal brace 104, first transverse brace 106, and second transverse brace 108 may have a "U" or "C" shaped cross-sectional shape. In each of these examples, each of the top and bottom portions/flanges may have one or more fastener receiving apertures to allow for modular construction, and adjustment to fit vehicles of varying lengths and widths.

Figure 6:
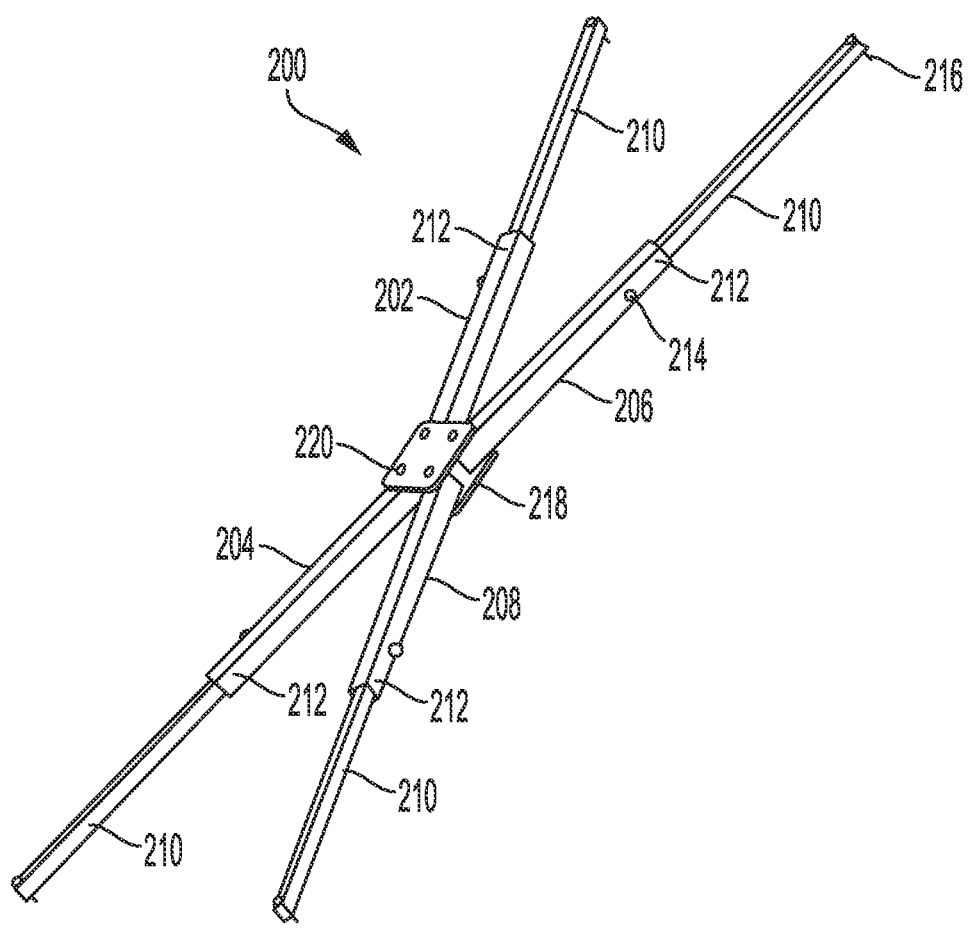
FIG. 6 is a perspective view of a frame structure, according to another embodiment of the invention.
Figure 7:
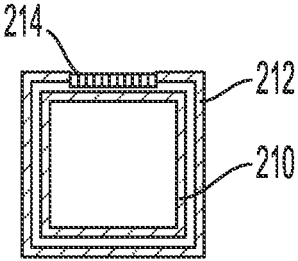
FIG. 7 is a cross sectional view of a component of the frame structure of FIG. 6.
Figure 8:
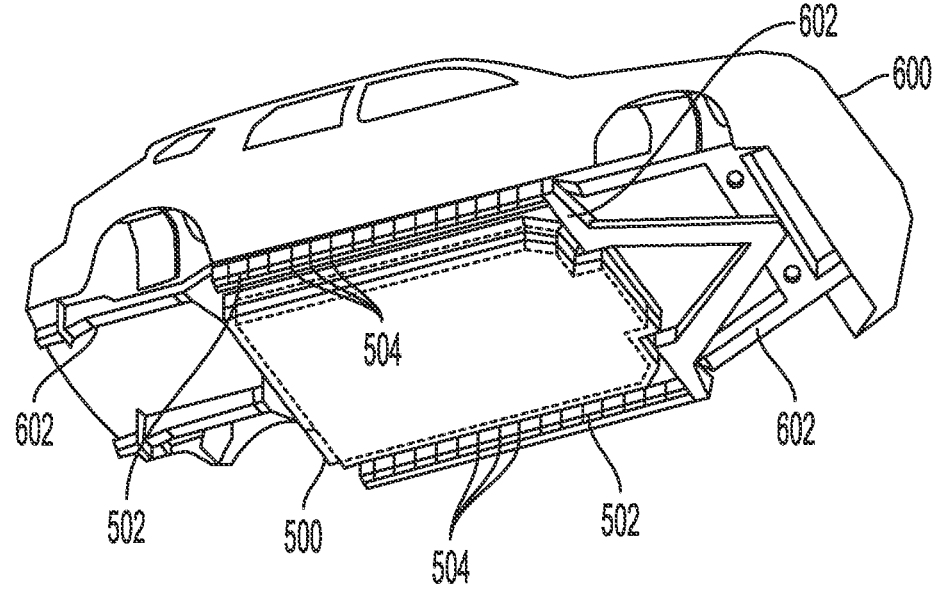
FIG. 8 is a perspective view of a typical vehicle with a battery assembly.

Referring to FIGS. 6 and 7, another exemplary reinforcing frame structure 200 of the present invention is illustrated. The reinforcing frame structure 200 may include at least four telescoping arms, such as first, second, third, and fourth arms 202, 204, 206, 208. Each of the first, second, third, and fourth arms 202, 204, 206, 208 includes an inner arm 210 and an outer arm 212, where the inner arm 210 slides into the outer arm 212. As shown, the inner arm 210 and outer arm 212 are concentric and have a rectangular cross-sectional shape. However, the inner arm 210 and outer arm 212 may have other cross sectional shapes, such as circular, oval, triangular, or other shape that allows for telescopic movement of the inner arm 210 with respect to the outer arm 212.

Each outer arm 212 may include a fastening or locking mechanism 214 adapted to receive a fastener to lock movement of the inner arm 210 with respect to the outer arm 212. The locking mechanism 214 may be a bolt, spring biased push tab, or other telescoping type lock mechanism know in the art.

Each inner arm 210 may include a fastening point or fastener receiving aperture 216 proximate to a terminal end of the inner arm 210. Each fastener receiving aperture 216 may be aligned with a corresponding battery assembly mounting aperture on the frame of the vehicle, and a fastener may be disposed in the fastener receiving aperture 216 to couple the reinforcing frame structure 200 to the frame of the vehicle when the battery assembly is removed.

The reinforcing frame structure 200 may also include a hub 218 that couples to each of the outer arms 212 of the first, second, third, and fourth arms 202, 204, 206, 208, with the first, second, third, and fourth arms 202, 204, 206, 208 extending outwardly from the hub 218 in an "X' type pattern.

The hub 218 may also include one or more locking mechanisms 220 to couple and/or lock each of the corresponding first, second, third, and fourth arms 202, 204, 206, 208 to the hub 218. Each locking mechanism 220 may be a pin, bolt, or other type of mechanism known in the art. Each locking mechanism 220 may have an unlocked state, where the corresponding first, second, third, and fourth arms 202, 204, 206, 208 is movable/pivotable around an axis of the locking mechanism 220 with respect to the hub 218, and a locked state, where a position of the corresponding first, second, third, and fourth arms 202, 204, 206, 208 is non-movable/non-pivotable with respect to the hub 218.

During use, the reinforcing frame structure 200 may be releasably coupled to a frame of a vehicle while the battery assembly is removed, to provide sufficient longitudinal, transverse, and torsional rigidity to the vehicle while the battery assembly is removed. For example, each of the first, second, third, and fourth arms 202, 204, 206, 208 may be adjusted via the corresponding locking mechanism 220 and locking mechanism 214 to align the fastener receiving aperture 216 with a corresponding battery assembly mounting aperture on the frame of the vehicle, and a fastener may be disposed in the fastener receiving aperture 216 to couple the reinforcing frame structure 200 to the frame of the vehicle when the battery assembly is removed.

As used herein, the term "coupled" can mean any physical, electrical, magnetic, or other connection, either direct or indirect, between two or more components or parts. The term "coupled" is not limited to a fixed direct coupling between components or parts.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A reinforcing frame structure adapted to releasably couple to a frame of a vehicle when a battery assembly of the vehicle is removed from the vehicle, the reinforcing frame structure comprising:

first and second longitudinal braces, wherein the first longitudinal brace is adapted to releasably couple to and extend along a first longitudinal side of the frame of the vehicle, and the second longitudinal brace is adapted to releasably couple to and extend along a second longitudinal side of the frame of the vehicle;

first and second transverse braces, wherein the first transverse brace is adapted to releasably couple to and extend along a first transverse side of the frame of the vehicle, and the second transverse brace is adapted to releasably couple to and extend along a second transverse side of the frame of the vehicle; and a cross brace adapted to couple to each of the first and second longitudinal braces and the first and second transverse braces, wherein each of the first and second longitudinal braces and the first and second transverse braces includes a fastener receiving aperture adapted to align with a respective battery assembly mounting aperture in the frame of the vehicle and receive a fastener, and the reinforcing frame is not adapted to include batteries and is adapted to provide structural support to the vehicle when the battery assembly is removed from the vehicle.

2. The reinforcing frame structure of claim 1, further comprising an angle brace adapted to couple to one of the first and second longitudinal braces and one of the first and second transverse braces.

3. The reinforcing frame structure of claim 1, wherein each of the fastener receiving apertures is an elongated slot.

4. The reinforcing frame structure of claim 3, wherein the elongated slots extend longitudinally along the respective first and second longitudinal braces and the first and second transverse braces.

5. The reinforcing frame structure of claim 1, wherein each fastener receiving aperture is multiple separate slots spaced longitudinally along the respective first and second longitudinal braces and the first and second transverse braces.

6. The reinforcing frame structure of claim 1, wherein the first and second longitudinal braces and the first and second transverse braces respectively have a square, round, "L", "U," "C", "X", "Z", or "T" cross-sectional shape.

7. The reinforcing frame structure of claim 1, wherein the cross brace includes a longitudinal portion having opposing first and second ends, and the first and second ends are respectively adapted to couple to the first and second transverse braces.

8. The reinforcing frame structure of claim 1, wherein the cross brace includes a transverse portion having opposing first and second ends, and the first and second ends are respectively adapted to couple to the first and second longitudinal braces.

9. A reinforcing frame structure adapted to releasably couple to battery assembly mounting apertures of a frame of a vehicle when a battery assembly of the vehicle is removed from the vehicle, the reinforcing frame structure comprising:
   a hub; and
   first, second, third, and fourth arms each extending outwardly from the hub, and that are adapted to respectively align with and releasably couple to the battery assembly mounting apertures.

10. The reinforcing frame structure of claim 9, wherein the first, second, third, and fourth arms extend outwardly from the hub in a "X" type pattern.

11. The reinforcing frame structure of claim 9, wherein each of the first, second, third, and fourth arms is pivotally coupled to the hub.

12. The reinforcing frame structure of claim 9, wherein each of the first, second, third, and fourth arms includes an outer and inner arms, wherein the inner arm is slidable with respect to the outer arm.

13. The reinforcing frame structure of claim 12, wherein each of the first, second, third, and fourth arms includes a locking mechanism adapted to restrict movement of the inner arm relative to the outer arm.

14. The reinforcing frame structure of claim 9, wherein the hub includes respective locking mechanisms adapted to lock positions of the corresponding first, second, third, and fourth arms relative to the hub.

\* \* \* \* \*